No. 709,921. Patented Sept. 30, 1902.
W. H. MORENUS.
GRADING AND EXCAVATING MACHINE.
(Application filed Jan. 26, 1901.)
(No Model.) 6 Sheets—Sheet 1.

Witnesses:
A. F. Durand
Ottilie C. Friberg

Inventor:
William H. Morenus
by Chas L. Page Atty

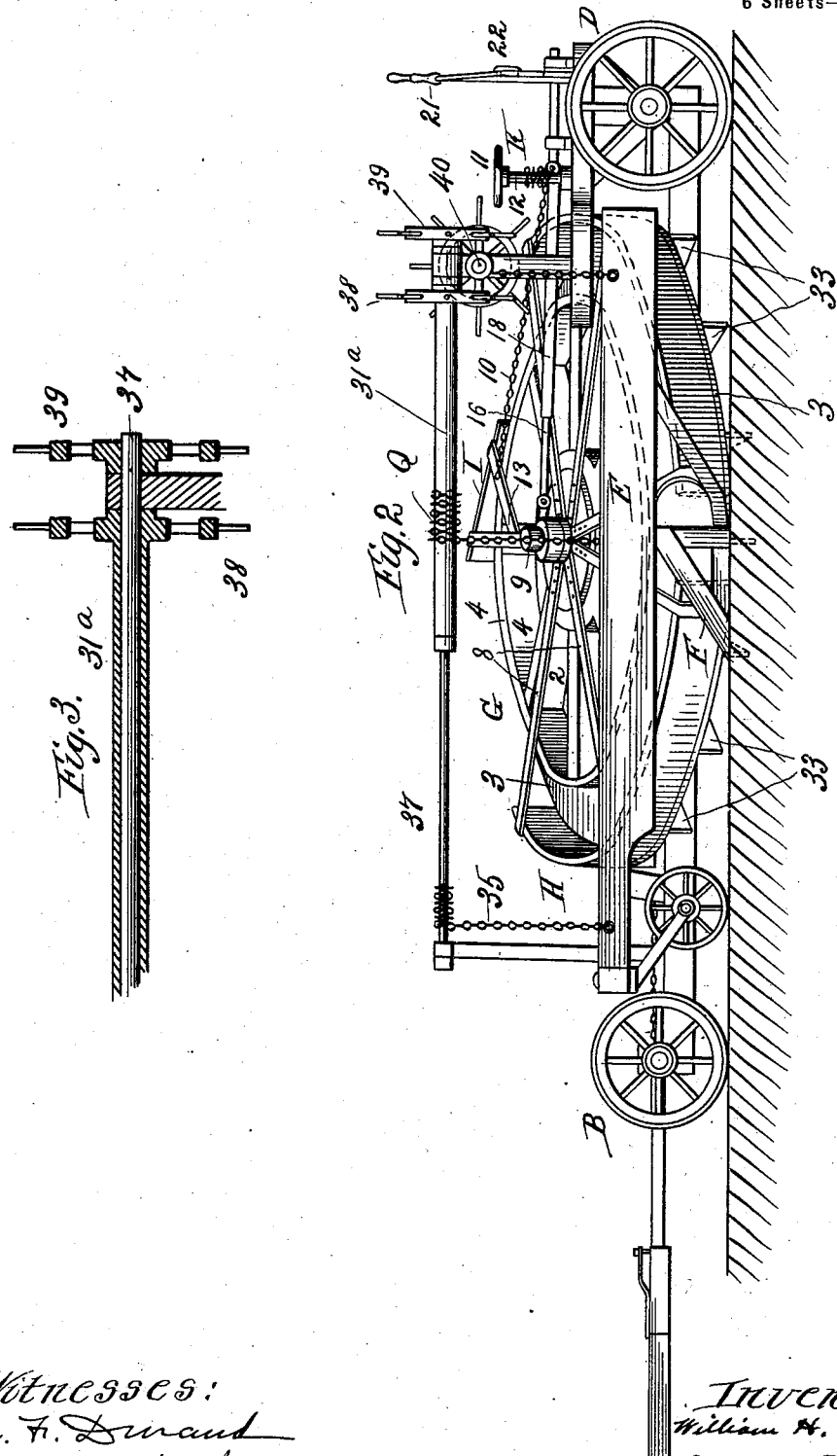

No. 709,921. Patented Sept. 30, 1902.
W. H. MORENUS.
GRADING AND EXCAVATING MACHINE.
(Application filed Jan. 26, 1901.)
(No Model.) 6 Sheets—Sheet 3.
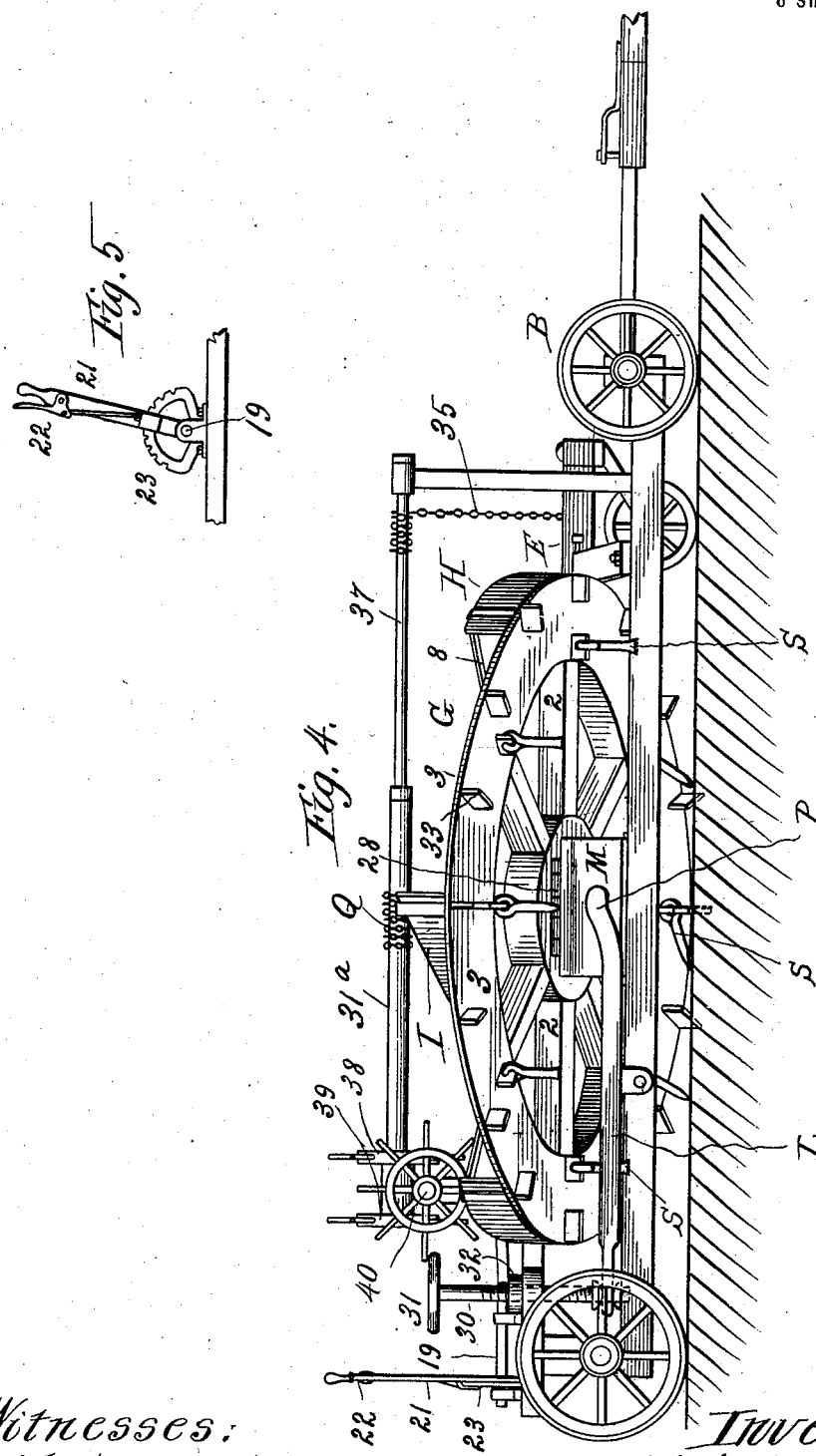
Witnesses:
Inventor:
William H. Morenus
by Chas. L. Page Atty No. 709,921. Patented Sept. 30, 1902.
W. H. MORENUS.
GRADING AND EXCAVATING MACHINE.
Application filed Jan. 26, 1901.

(No Model.) 6 Sheets—Sheet 4.

Witnesses:
A. F. Durand
Ottilie C. Freiberg

Inventor:
William H. Morenus
by Chas. L. Page Atty.

No. 709,921. Patented Sept. 30, 1902.
W. H. MORENUS.
GRADING AND EXCAVATING MACHINE.
(Application filed Jan. 26, 1901.)
(No Model.) 6 Sheets—Sheet 5.
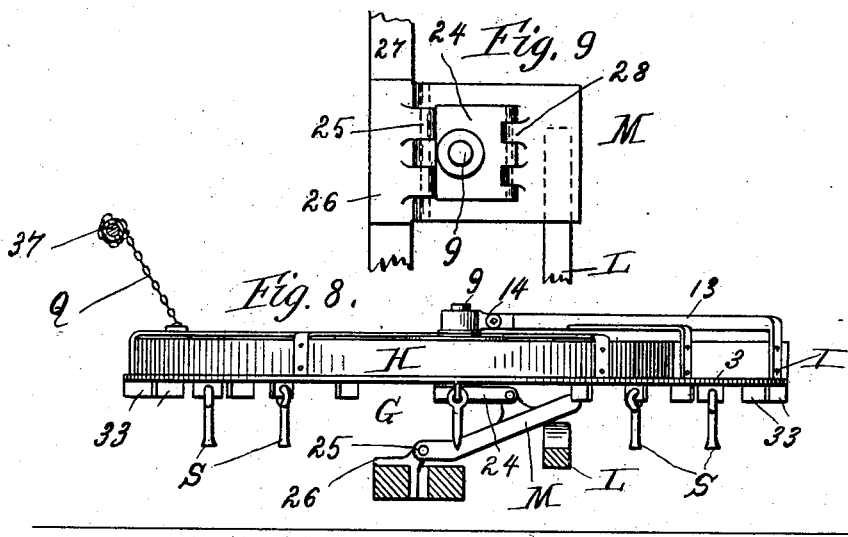
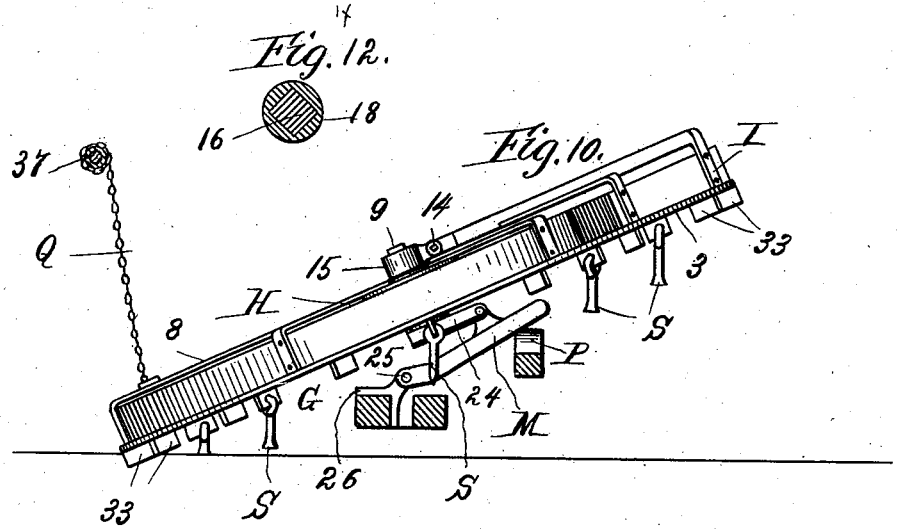
Witnesses:
A. F. Durand
Ottilie C. Freiberg.
Inventor:
William H. Morenus
by Chas. L. Page Atty.
THE NORRIS PETERS CO., PHOTO-LITHO., WASHINGTON, D. C.

No. 709,921. Patented Sept. 30, 1902.
W. H. MORENUS.
GRADING AND EXCAVATING MACHINE.
(Application filed Jan. 26, 1901.)
(No Model.) 6 Sheets—Sheet 6.
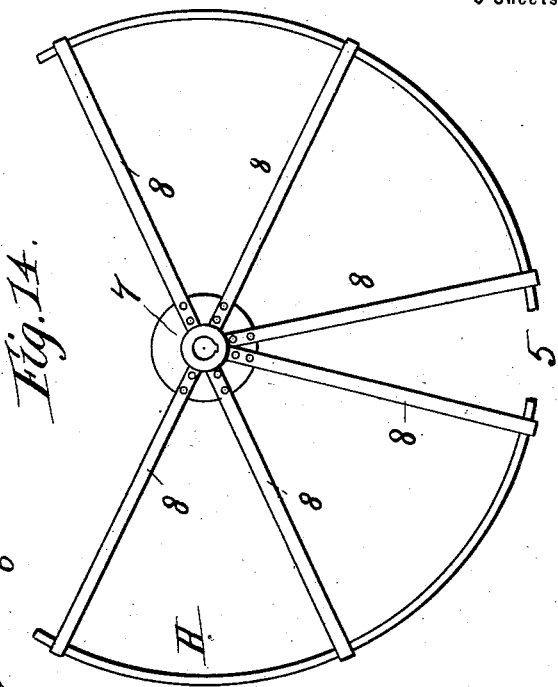
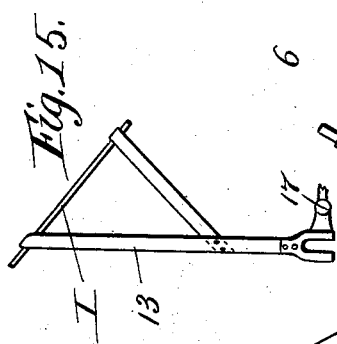
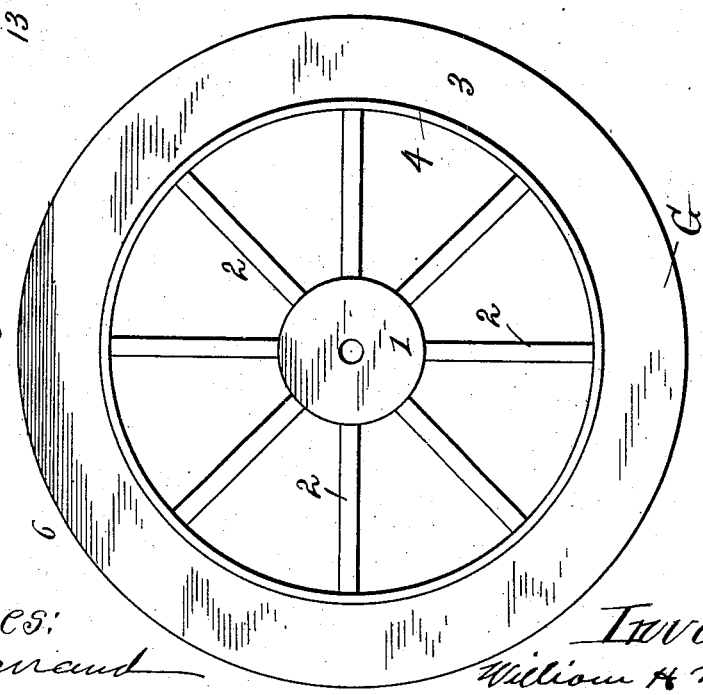
Witnesses:
A. F. Durand
Ottilie C. Friberg.
Inventor:
William H. Morenus
by Chas. L. Page
Atty

UNITED STATES PATENT OFFICE.

WILLIAM H. MORENUS, OF LAKEVIEW, IOWA, ASSIGNOR TO FREDERICK C. AUSTIN, OF CHICAGO, ILLINOIS.

GRADING AND EXCAVATING MACHINE.

SPECIFICATION forming part of Letters Patent No. 709,921, dated September 30, 1902.

Application filed January 26, 1901. Serial No. 44,788. (No model.)

*To all whom it may concern:*

Be it known that I, WILLIAM H. MORENUS, a citizen of the United States, residing at Lakeview, in the county of Sac and State of Iowa, have invented a certain new and useful Improvement in Grading and Excavating Machines, of which the following is a specification.

My invention relates to grading and excavating machines of the class in which a wheeled carriage or body-frame is provided with an inclined elevating conveyer-wheel, which runs upon the ground during the general advancement of the machine and takes or receives the soil from a plow, the soil thus received by the elevating conveyer-wheel being carried up by the same to the point of discharge.

Objects of my invention are to shift the point of discharge forwardly, rearwardly, and laterally, to vary the height of the point of discharge, to permit the elevating conveyer-wheel to be bodily raised and lowered and to be tilted independently of means whereby it can be bodily raised and lowered, to enable an attendant on the machine to readily vary the height and inclination of the elevating conveyer-wheel and also shift the point of discharge of soil from such wheel, and to provide certain novel and improved details, as hereinafter more fully set forth.

Figure 1:
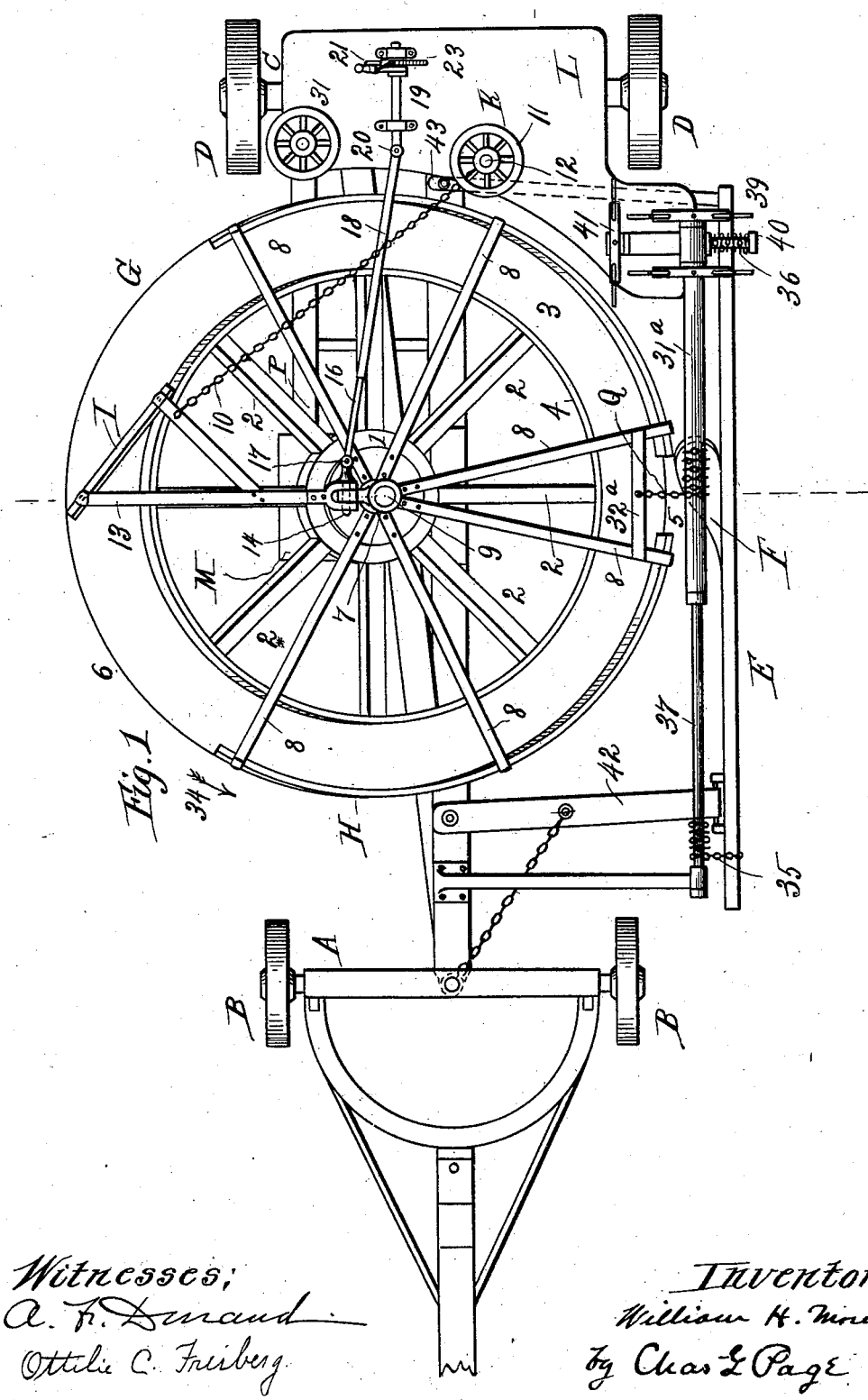
Figure 6:
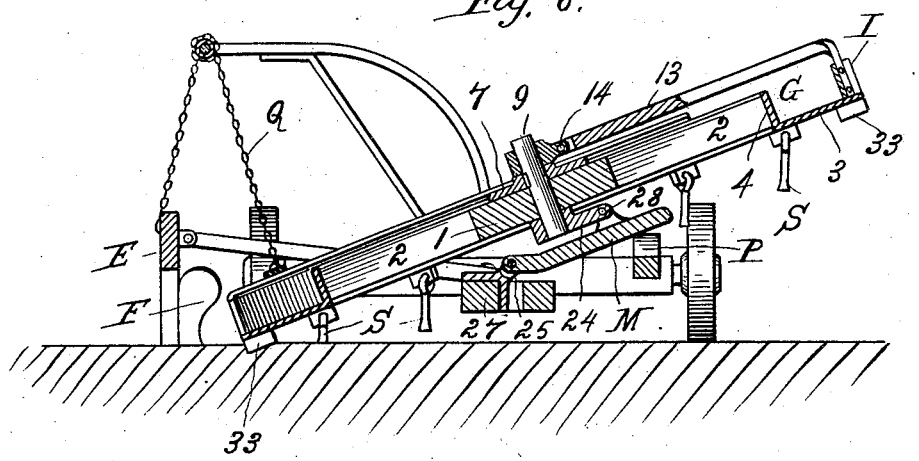
Figure 7:
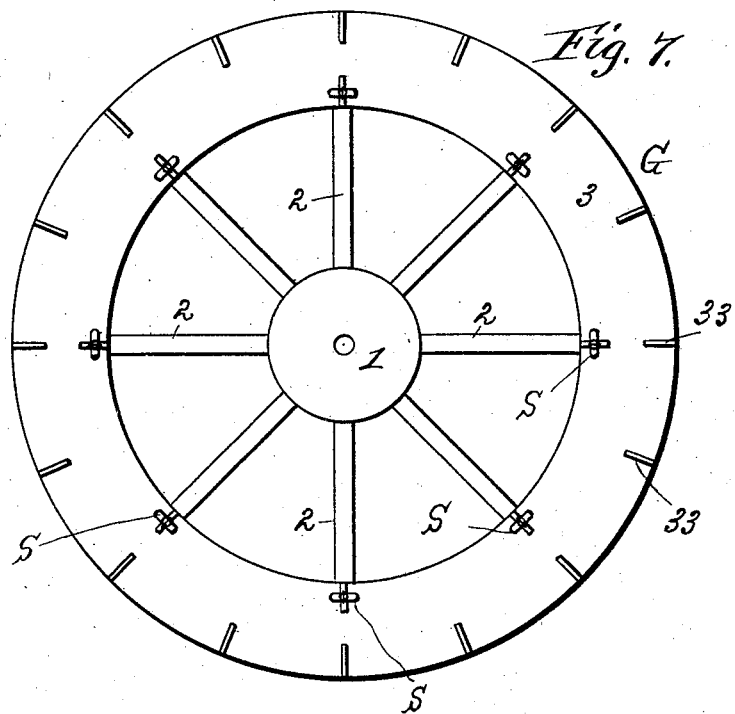

In the accompanying drawings, Figure 1 is a top plan view of a grading and excavating machine embodying the principles of my invention. Fig. 2 shows said machine in side elevation. Fig. 3 is a detail view, on a larger scale, illustrating in elevation a portion of a rotary winding-shaft and in longitudinal section a portion of a winding-drum or hollow winding-shaft, the hand-wheels for said shafts being in section. Fig. 4 shows the machine in side elevation as viewed from the side opposite the side represented in Fig. 2. Fig. 5 is a detail of a lever-and-latch device shown in certain other figures on the rear platform of the machine. Fig. 6 is a transverse section of the machine on a plane passing centrally through the elevating conveyer-wheel, the spindle for said wheel being shown in elevation. Fig. 7 is a bottom plan view of the elevating conveyer-wheel. Fig. 8 comprises a portion of Fig. 6 with the elevating conveyer-wheel and certain parts in elevation and the said wheel in a raised horizontal position. Fig. 9 is a detail view mainly showing in top plan certain hinge connections between bearing 24 and support M and between said support M and the body-frame of the machine. Fig. 10 is a view similar to Fig. 8, but showing the elevating conveyer-wheel tilted. Fig. 11 shows, partly in section and partly in elevation, a portion of an automatically-adjustable extension rod or shaft employed for raising and lowering the combined scraper and deflector. Fig. 12 is a section through Fig. 11 on line *x x*, on a larger scale. Fig. 13 is a top plan view of the elevating conveyer-wheel. Fig. 14 is a like view of the outer guard and its supporting-arms. Fig. 15 is a detail showing the combined scraper and deflector and its supporting-arm.

The machine comprises a suitable body-frame or carriage provided with a front axle A for the forward wheels B and a rear axle C for the rear wheels D. A longitudinally-arranged plow-beam E is provided with a plow F and supported at one side of the machine by suitable means or mechanism by which it can be raised, lowered, and tilted, as may be desired. The rotary elevating conveyer-wheel G is adapted to take the plowed-up soil from the plow at one side of the machine and deliver such soil at the opposite side of the machine from a suitably-elevated point of discharge. This rotary elevating conveyer-wheel is carried by the body-frame of the machine and is arranged between the front and rear wheels B D thereof. During operation the rotary elevating conveyer-wheel revolves on a plane which is inclined transversely to the length of the machine and which dips toward the plow to an extent to permit the plow to deliver the soil upon the upper side of such elevating conveyer-wheel and also permit said wheel to engage the ground, so as to cause it to rotate as the machine advances. The elevating conveyer-wheel may be a disk or plate of any suitable construction, a simple and preferred form, however, being such as shown—to wit, a wheel comprising a central hub 1, provided with spokes 2, which radiate from the hub and connect with and support an annular disk or plate 3, upon which the soil is delivered from the plow. While the soil is being carried by the elevating conveyer-wheel from the plow to the point of discharge it is kept upon said wheel by a trough-shaped construction involving a lateral opening or passage-way which permits the delivery of the soil from the plow and a lateral opening or passage-way which permits the discharge of the soil at a desired point. This trough-shaped construction comprises the disk or plate 3 as a bottom and a couple of oppositely-arranged sides, which are spaced with reference to the desired carrying capacity of the elevating conveyer-wheel and arranged to rise from the plane of the disk or plate 3. One of these oppositely-arranged sides is formed by a continuous annular flange or transversely-flat ring 4, which is preferably rigid with the wheel and arranged to form the inner side of the trough-like construction. The opposite outer side of the trough-like construction is formed by a guard H, consisting of a transversely-flat band, which is formed on the line of a circle and arranged over and independent of the rotary disk or plate 3 of the elevating conveyer-wheel. This guard H is made with two gaps, the one being arranged to provide a lateral opening or passage 5, Fig. 14, through which soil can be delivered from the plow to the elevating conveyer-wheel, and the other, which is relatively wider, being arranged to provide a lateral opening or passage 6, through which soil can be discharged from the elevating conveyer-wheel. The guard H may consist of a ring or hoop cut away at suitable points to provide the lateral openings 5 and 6 and rigidly connected with a central hub 7 by spokes or arms 8, or, if preferred, it can be formed by a disk having a marginal flange arranged to constitute the guard H, in which case the disk will cover the spaces between the spokes of the elevating conveyer-wheel, and thereby prevent dirt from being accidentally thrown into such mechanism as may be below said wheel. In the construction illustrated, the hub 1 of the elevating conveyer-wheel (see Fig. 6) is fitted to revolve upon a short upturned spindle or axle 9, while the hub or central portion of the plate or frame which provides the outer guard H is keyed to said axle or spindle, in which way, while the elevating conveyer-wheel will be free to rotate, the guard H will be held against rotation, and thereby maintain its openings 5 and 6 in proper relation, respectively, to the plow and the point for discharging the soil from the elevating conveyer-wheel. The lower edge portions of the guard H are set sufficiently close to the plate or disk portion 3 of the elevating conveyer-wheel to prevent soil which is being carried up by such wheel from passing out between the wheel and the lower edge portions of the guard, while at the same time said parts are relatively positioned to permit the wheel to rotate freely and independently of the overhanging guard.

The soil which is carried up by the elevating conveyer-wheel is deflected from the latter at a desired point of discharge by a combined scraper and deflector I. The combined scraper and deflector I is arranged over the disk or marginal soil-carrying portion 3 of the elevating conveyer-wheel and is set oblique or tangential to the flange or guard portion 4 of such wheel, so as to oppose the advancement of the soil in a circular path at a point suitable for discharge and at such point deflect the soil in a direction to discharge it from the elevating conveyer-wheel at the delivery side of the machine. The combined scraper and deflector is also set sufficiently close to the marginal soil-carrying portion 3 and the flange or guard portion 4 of the elevating conveyer-wheel to properly scrape the soil therefrom. The combined scraper and deflector I is adjustable with reference to the gap or opening 6 of the guard H, which overhangs the elevating conveyer-wheel, so that by adjusting the combined scraper and deflector the point of discharge can be varied—that is to say, such point can be shifted either toward the front or toward the rear of the machine and also be shifted laterally toward or away from the body-frame of the machine, as may be desired. To such end the combined scraper and deflector is supported to swing about the axis of the upturned axle or spindle 9 for the elevating conveyer-wheel. In Fig. 1 the combined scraper and deflector is near the middle of gap 6 in the guard H. The combined scraper and deflector can be swung either forwardly or rearwardly from such position, so as to shift the point of discharge toward the front or rear of the machine, as the case may be, and by swinging the combined scraper and deflector to a suitable extent either way the point of discharge will also be obviously shifted inwardly or toward the body-frame of the machine. While the combined scraper and deflector could be positively adjusted in both directions by any suitable adjusting mechanism, it will in practice be only necessary to provide a draw chain or cable 10, arranged to connect the scraper and deflector with a winding device K at the rear portion of the machine. By operating the winding device K, consisting, for example, of a hand-wheel 11 and winding shaft or drum 12, Figs. 1 and 2, the chain or cable can be wound upon the drum or shaft 12, so as to draw the combined scraper and deflector toward the rear of the machine. When, however, it is desired to position the combined scraper and deflector farther forward, it will only be necessary to unwind the chain or cable 10, since in such case the soil which is carried up by the elevating conveyer-wheel will impact against and force forward the combined scraper and deflector to an extent proportional to the slack on the part of the chain or cable.

The combined scraper and deflector I is carried by an arm 13, which is in turn supported to swing about the axis of the upturned spindle 9 for the elevating conveyer-wheel.

By this arrangement the combined scraper and deflector I can be swung in a plane parallel with the plane of the marginal soil-carrying portion 3 of the elevating conveyer-wheel. The combined scraper and deflector I is also arranged whereby it can be swung upwardly in a direction away from the marginal portion of the elevating conveyer-wheel, and to such end the arm 13, which carries the combined scraper and deflector, is articulated or jointed, as at 14, Figs. 1, 6, 8, and 10, which show the arm 13 as comprising an outer end portion provided with the combined scraper and deflector and an inner end portion 15, connected with the outer end portion by a pivot, as at 14, and forming a hub or collar, which is arranged to turn upon the spindle 9 for the elevating conveyer-wheel.

As a means for swinging upwardly the portion of the arm 13 which carries the combined scraper and deflector I said arm is connected with a rod or shaft 16 by a universal joint, as at 17, Fig. 1, and this rod or shaft 16 is connected with rotary adjusting mechanism, whereby it can be turned about its axis for the purpose of raising and lowering the combined scraper and deflector. As a means or mechanism for thus operating the rod or shaft 16 the latter is made square or polygonal in cross-section, as in Figs. 11 and 12, and is fitted to slide in the correspondingly-shaped bore of a sleeve 18, which is in turn connected with a rotary shaft 19, Fig. 1, by a universal joint, as at 20. The rod 16 and the sleeve 18 extend toward the rear of the machine, and the rotary shaft 19 is suitably supported upon a rear platform L. The rotary shaft 19 is arranged whereby it can be turned alternately in opposite directions, and as a convenient means for turning said shaft in either direction it is provided with an arm 21, (see also Fig. 5,) carrying a hand latch device 22, arranged to engage a rack-segment 23 on the rear platform L. By operating the lever 21 the rotary shaft 19, sleeve 18, and shaft 16, forming a universally-jointed connection between the lever and the combined scraper and deflector, can be turned so as to either raise or lower the combined scraper and deflector, as may be desired. On the other hand, when the combined scraper and deflector is swung in a plane parallel with the marginal soil-carrying portion 3 of the elevating conveyer-wheel the rod or shaft 16 will slide within the sleeve 18. When, therefore, it is desired to raise the combined scraper and deflector so as to stop the discharge of soil from the elevating conveyer-wheel while said wheel is turning, it will only be necessary to swing the lever 21 in a direction to cause the combined scraper and deflector to swing upwardly and away from the marginal soil-carrying portion 3 of the elevating conveyer-wheel.

The elevating conveyer-wheel is supported so that it can be tilted and also bodily raised and lowered with reference to the character of the work and to the desired elevation of the point of discharge, it being observed that in practice it is at times desirable to vary the extent of depression of the portion of the elevating conveyer-wheel nearest the plow and that as said wheel is employed to discharge the soil into a wagon for the purpose of loading the latter it is occasionally desirable to vary the height of the point of discharge. As a simple and convenient means for thus adjusting the elevating conveyer-wheel, the lower end of the spindle 9 for said wheel is suitably secured and held by a bearing or bracket 24, (see Figs. 6 and 9,) which is supported by and hinged upon a swinging support M. The said support M is hinged at one end, as at 25, to an angle-iron 26 on one of the longitudinal bars 27 of the body-frame, while the bearing or bracket 24 is hinged, as at 28, to the opposite end portion of the vibratory arm or support M. The free end portion of arm or support M rests upon a lever P, which is fulcrumed at a point between its ends upon the body-frame of the machine, as at 29, Fig. 4. The vertically-swinging arm or support M bears upon one end portion of said lever P, while the opposite end portion of this lever is engaged by a vertically-arranged adjusting-screw 30, provided at its upper end with a hand-wheel 31 and positioned so as to be accessible to an attendant standing upon the rear platform L. By reason of such arrangement an attendant standing on the rear platform L of the machine can vary the dip or inclination of the elevating conveyer-wheel and also raise or lower the central pivotal support for said wheel, as may be desired. For example, by turning the threaded shaft 30, which works through a threaded bearing at 32, Fig. 4, and engages the lever P, said shaft 30 will be adjusted up or down, according to the direction in which it is turned, and the lever P will be actuated so as to swing the hinged support M up or down, as the case may be, and thereby raise or lower the spindle-bearing 24, in accordance with the direction in which the arm M is moved. By thus operating the arm or support M the central bearing for the elevating conveyer-wheel can be raised or lowered, and, on the other hand, the spindle-bearing 24, which is hinged, as hereinbefore described, can be swung up or down independently of the arm M, to which it is hinged, and in this way the elevating conveyer-wheel can be tilted independently of the elevation of a vertical movable support to which its central bearing is hinged. The elevating conveyer-wheel can be tilted by suitable means, a simple, convenient, and preferred arrangement being to provide a chain Q, which, as best shown in Figs. 1 and 6, is arranged to wind upon a rotary winding drum or sleeve 31ª and connect with a cross-bar 32ª, Fig. 1, secured to a pair of the arms 8, which are rigid with the guard H.

In order that the elevating conveyer-wheel may engage the ground at a point near the plow, so as to cause said wheel to rotate while the wheeled carriage or body-frame is being drawn over the ground, said elevating conveyer-wheel has its under side provided with teeth 33, which are rigid with said wheel and arranged in annular series. It occasionally happens, however, that in passing over soft or mucky soil the short teeth 33 fail to perform their required duty. To insure proper action, therefore, on the part of the elevating conveyer-wheel under all circumstances, it is also provided with a set of pendent swinging teeth S, which under ordinary conditions successively contact with and trail upon the ground while the wheeled carriage or body-frame is advancing and the elevating conveyer-wheel is turning in the direction indicated by arrow 34 in Fig. 1 by reason of the engagement of its rigid teeth 33 with the ground. In case, however, the softness of the soil does not offer sufficient opposition to the teeth 33 to cause the rotation of the elevating conveyer-wheel the disposition of said wheel to slip along the soil without rotating will tend to bring any one of the teeth S, which would otherwise trail upon the ground, to a vertical position, whereat said tooth will be held against further swing by any suitable stop or abutment arranged on what might be termed the "jack-knife" principle. While, therefore, the teeth 33 perform the desired function of effecting the rotation of the elevating conveyer-wheel, the swinging teeth S will successively engage and trail upon the ground during the rotation of said elevating conveyer-wheel, as illustrated in Fig. 4. In case, however, the elevating conveyer-wheel should slip along the ground without rotating the teeth S (shown trailing on the ground in Fig. 4) will be forced into the ground until they reach a vertical position, where a continuance of such swing on the part of said teeth S will be arrested, it being observed that the slip of the elevating conveyer-wheel without rotation while the wheel-carriage is advancing affects the teeth S in the same way said teeth would be affected should the wheel-carriage stand still and the elevating conveyer-wheel be turned in a direction opposite to the direction in which it is turned for working purposes. The teeth S, therefore, are limited to swing in about a quarter of a circle.

The plow-beam E is suspended by raising and lowering chains 35 and 36. The chain 35 is arranged to connect the plow-beam with a rotary winding-shaft 37, which is suitably supported at a desirable elevation at one side of the machine. The winding drum or sleeve 31ª, hereinbefore referred to, is arranged upon the winding-shaft 37, as in Figs. 1, 2, and 3, and is provided with a hand-wheel 38, whereby it can be conveniently operated for the purpose of tilting the elevating conveyer-wheel. The winding-shaft 37 is also provided with a hand-wheel 39, whereby it can be operated for the purpose of raising and lowering the forward end of the plow-beam. The raising and lowering chain 36 for the rear end of the platform connects with a suitably-elevated winding-shaft 40, arranged transversely to the winding-shaft 37 and provided with a hand-wheel 41.

The body-frame of the machine is substantially in the nature of a reach or reach-frame extending between the front and rear axles, and with such arrangement the plow-beam can be steadied by combined draft and stay bars 42 and 43, pivoted to the reach or reach-frame and hinged to or otherwise suitably connected with the plow-beam.

What I claim as my invention is—

1. In a grading and excavating machine, a rotary elevating conveyer-wheel supported to run upon the ground in an inclined position and adapted to receive the soil from a plow and carry such soil up to the point of discharge; a combined scraper and deflector arranged to scrape and deflect the soil from the wheel and supported to swing about the axis of said wheel; and a device for operating the combined scraper and deflector arranged and adapted to be actuated at will by an attendant upon the machine.

2. A grading and excavating machine comprising a rotary elevating conveyer-wheel supported to run upon the ground in an inclined position and having a soil-carrying portion adapted to receive the soil from a plow and carry such soil up to the point of discharge; and a combined scraper and deflector adapted to deflect the soil from the soil-carrying portion of the elevating conveyer-wheel and having a swinging adjustment about the axis of the elevating conveyer-wheel, and also away from and toward the plane of the soil-carrying portion of such wheel.

3. A grading and excavating machine comprising a rotary elevating conveyer-wheel supported to run upon the ground in an inclined position and having a soil-carrying portion adapted to receive the soil from a plow and carry such soil up to the point of discharge; a combined scraper and deflector arranged to deflect the soil from the soil-carrying portion of the elevating conveyer-wheel and supported to swing about the axis of such wheel; a chain or equivalent flexible connection between the combined scraper and deflector; and an operating device provided for varying the length of flexible connection between such operating device and the combined scraper and deflector, and thereby shift the point of discharge by an adjustment of the combined scraper and deflector.

4. A grading and excavating machine comprising a rotary elevating conveyer-wheel supported to run upon the ground in an inclined position and having a soil-carrying portion adapted to receive the soil from a plow and carry such soil up to the point of discharge; a combined scraper and deflector adapted to deflect the soil from the soil-carrying portion of the elevating conveyer-wheel and supported to swing about the axis of such wheel and to swing away from and toward the soil-carrying portion of the latter; a rotary shaft applied for swinging the combined scraper and deflector toward and away from the plane of the soil-carrying portion of the elevating conveyer-wheel and adapted for automatic longitudinal extension and contraction with reference to the swing of the combined scraper and deflector about the axis of the elevating conveyer-wheel; and a suitable operating device for actuating the rotary shaft.

5. A grading and excavating machine comprising a rotary conveyer-wheel which runs upon the ground in an inclined position to receive the soil from the plow and carry such soil up to the point of discharge; a tilting bearing centrally supporting the elevating conveyer-wheel and hinged to a tilting support which is in turn carried by the body-frame of the machine; means for tilting the elevating conveyer-wheel and its central supporting-bearing independently of the tilting support on the body-frame; and means for raising and lowering the tilting support on the body-frame so as to bodily raise or lower the elevating conveyer-wheel.

6. A grading and excavating machine comprising a wheeled body-frame; a plow; a rotary elevating conveyer-wheel which runs upon the ground in an inclined position to receive the soil from the plow and carry such soil up to the point of discharge; a tilting bearing centrally supporting the elevating conveyer-wheel and hinged to a tilting support which is carried by the body-frame of the machine; means for tilting the elevating conveyer-wheel and its central supporting-bearing; a lever fulcrumed upon the body-frame of the machine and applied for adjusting said tilting support which is carried by the body-frame; and an adjusting device for operating said lever.

7. A grading and excavating machine comprising a wheeled body-frame; a plow; a tilting conveyer-wheel which runs upon the ground in an inclined position to receive the soil from the plow and carry such soil up to the point of discharge; a rotary winding-drum or hollow shaft; a chain or cable applied whereby the elevating conveyer-wheel can be tilted by operating the winding-drum or hollow shaft; and a plow raising and lowering mechanism involving a rotary shaft which extends through the said winding drum or shaft.

WILLIAM H. MORENUS.

Witnesses:
CHARLES G. PAGE,
OTTILIE C. FREIBERG.